United States Patent
Swartz et al.

(10) Patent No.: US 9,546,597 B2
(45) Date of Patent: Jan. 17, 2017

(54) TURBOCHARGER WASTE-GATE VALVE BUSHING

(71) Applicant: GM GLOBAL TECHNOLOGY OPERATIONS LLC, Detroit, MI (US)

(72) Inventors: Julie Swartz, Commerce Township, MI (US); Robert Bielas, Shelby Township, MI (US); Louis P. Begin, Rochester, MI (US); Roman Mudel, Novi, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 280 days.

(21) Appl. No.: 14/490,712

(22) Filed: Sep. 19, 2014

(65) Prior Publication Data

US 2016/0084163 A1 Mar. 24, 2016

(51) Int. Cl.
| | |
|---|---|
| *F02D 23/00* | (2006.01) |
| *F01D 17/00* | (2006.01) |
| *F02C 7/06* | (2006.01) |
| *F02B 37/18* | (2006.01) |
| *F02C 6/12* | (2006.01) |
| *F01D 17/10* | (2006.01) |

(52) U.S. Cl.
CPC .............. *F02C 7/06* (2013.01); *F02B 37/183* (2013.01); *F02B 37/186* (2013.01); *F02C 6/12* (2013.01); *F01D 17/105* (2013.01); *F05D 2220/40* (2013.01); *F05D 2240/54* (2013.01); *F05D 2260/57* (2013.01); *F05D 2300/30* (2013.01); *F05D 2300/516* (2013.01)

(58) Field of Classification Search
CPC ........ F03B 37/18; F02B 37/183; F02B 37/186
USPC ......... 60/605.2, 602; 123/506; 384/286–294, 384/283; 415/144–145
See application file for complete search history.

(56) References Cited

U.S. PATENT DOCUMENTS 1,422,655 A * 7/1922 Brehmer ................ B21C 23/14
29/898.1
6,168,314 B1 * 1/2001 Imai ........................ F16C 23/02
384/215

(Continued)

FOREIGN PATENT DOCUMENTS

CN 201062538 Y * 5/2008 ........... Y02T 10/144

OTHER PUBLICATIONS

CN201062538 English Translation by Espacenet, Jun. 28, 2016.*

*Primary Examiner* — Thai Ba Trieu
*Assistant Examiner* — Deming Wan
(74) *Attorney, Agent, or Firm* — Quinn Law Group, PLLC

(57) ABSTRACT

A turbocharger for an internal combustion engine includes a rotating assembly having a turbine wheel disposed inside a turbine housing and a compressor wheel disposed inside a compressor cover. The turbocharger also includes a waste-gate assembly configured to selectively redirect at least a portion of the engine's post-combustion gases away from the turbine wheel. The waste-gate assembly includes a valve, a rotatable shaft connected to the valve, and a bushing fixed relative to the turbine housing and disposed concentrically around the shaft such that the shaft rotates inside the bushing for opening and closing the valve. The bushing is defined by a length, an outer surface in contact with the turbine housing, and an inner surface in contact with the shaft. The inner surface includes a plurality of longitudinal grooves configured to counteract friction between the bushing and the shaft and avoid seizure of the shaft relative to the bushing.

20 Claims, 4 Drawing Sheets

(56) References Cited

U.S. PATENT DOCUMENTS

| | | | | |
|---|---|---|---|---|
| 9,039,354 B2 * | 5/2015 | Delitz | ................. | F01D 17/20 |
| | | | | 415/148 |
| 2005/0286822 A1 * | 12/2005 | Maruyama | ............. | F16C 17/02 |
| | | | | 384/283 |
| 2011/0176757 A1 * | 7/2011 | Heldmann | ............. | F16C 33/28 |
| | | | | 384/29 |
| 2014/0348643 A1 * | 11/2014 | House | ................. | F02B 37/186 |
| | | | | 415/170.1 |

* cited by examiner

FIG. 4
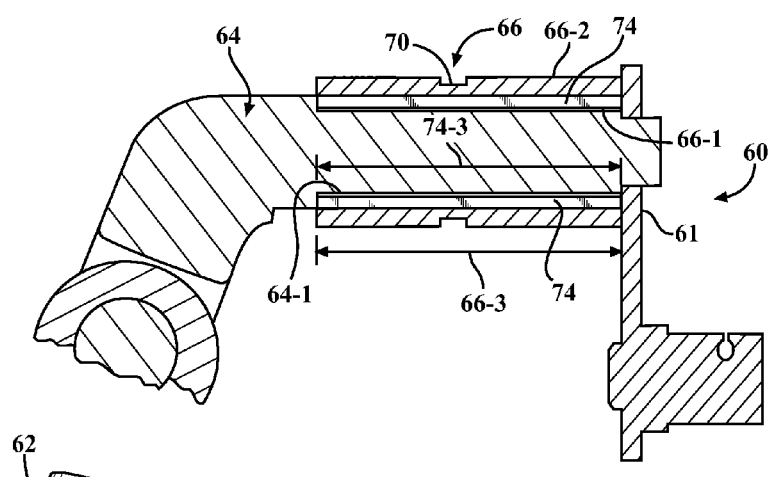
FIG. 5
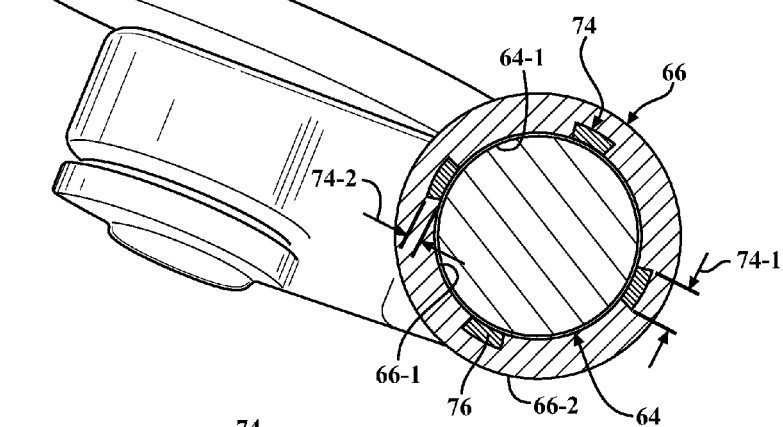
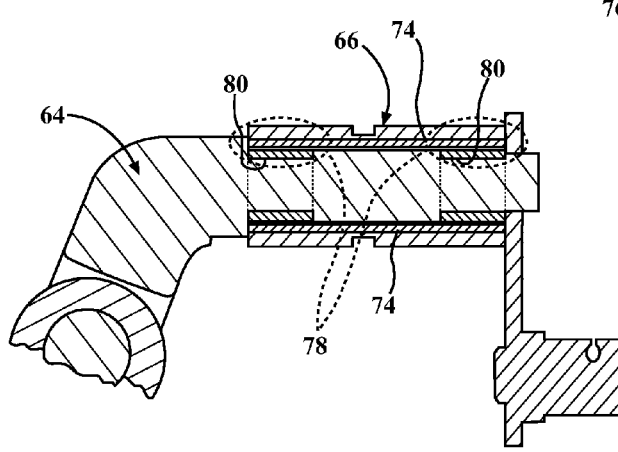
FIG. 6

TURBOCHARGER WASTE-GATE VALVE BUSHING

TECHNICAL FIELD

The present disclosure relates to waste-gate valve bushing for a turbocharger configured for seizure avoidance.

BACKGROUND

Internal combustion engines (ICE) are often called upon to generate considerable levels of power for prolonged periods of time on a dependable basis. Many such ICE assemblies employ a supercharging device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power. Frequently, such turbochargers are driven by the engine's exhaust gases.

A typical exhaust gas driven turbocharger includes a central shaft that is supported by one or more bearings and that transmits rotational motion between a turbine wheel and an air compressor wheel. Both the turbine and compressor wheels are fixed to the shaft, which in combination with various bearing components constitute the turbocharger's rotating assembly. Turbochargers frequently employ waste-gate valves to limit operational speeds of the rotating assembly in order to maintain turbocharger boost within prescribed limits and prevent rotating assembly over speed.

SUMMARY

One embodiment of the disclosure is directed to a turbocharger for pressurizing an airflow for delivery to an internal combustion engine configured to exhaust post-combustion gases. The turbocharger includes a rotating assembly having a turbine wheel disposed inside a turbine housing and a compressor wheel disposed inside a compressor cover. The turbocharger also includes a waste-gate assembly configured to selectively redirect at least a portion of the engine's post-combustion gases away from the turbine wheel.

The waste-gate assembly includes a valve, a rotatable shaft connected to the valve, and a bushing fixed relative to the turbine housing and disposed concentrically around the shaft. The shaft rotates inside the bushing to thereby selectively open and close the valve. The bushing is defined by a length, an outer surface in contact with the turbine housing, and an inner surface in contact with the shaft. The inner surface includes a plurality of longitudinal grooves configured to counteract friction between the bushing and the shaft and avoid seizure of the shaft relative to the bushing.

At least one of the longitudinal grooves may include a low-friction material.

The low-friction material may be graphite or a ceramic-based material. The envisioned ceramic-based material may be one of a silicon carbide, silicon nitride, chromium carbide, zirconia, carbon-carbon composite, and metal-ceramic composite.

The longitudinal grooves may be evenly spaced around the inner surface and extend out toward the outer surface.

The plurality of longitudinal grooves may include four individual grooves.

At least one of the plurality of longitudinal grooves may extend along at least 75% of the length of the bushing.

At least one of the plurality of longitudinal grooves may be configured to collect particulates to thereby reduce the friction between the bushing and the shaft.

The turbocharger may additionally include a locating feature configured to set the bushing relative to the turbine housing.

Another embodiment of the present disclosure is directed to an internal combustion engine having the turbocharger as described above.

The above features and advantages, and other features and advantages of the present disclosure, will be readily apparent from the following detailed description of the embodiment(s) and best mode(s) for carrying out the described invention when taken in connection with the accompanying drawings and appended claims.

BRIEF DESCRIPTION OF THE DRAWINGS

FIG. 4 is a schematic close up cross-sectional side view of the bushing shown in FIG. 2 according to one embodiment.

FIG. 5 is a schematic close up cross-sectional side view of the bushing shown in FIG. 2 according to an alternate embodiment.

FIG. 6 is a schematic close up cross-sectional side view of the shaft and bushing subassembly shown in FIG. 3 according to an alternate embodiment.

DETAILED DESCRIPTION

Figure 1:
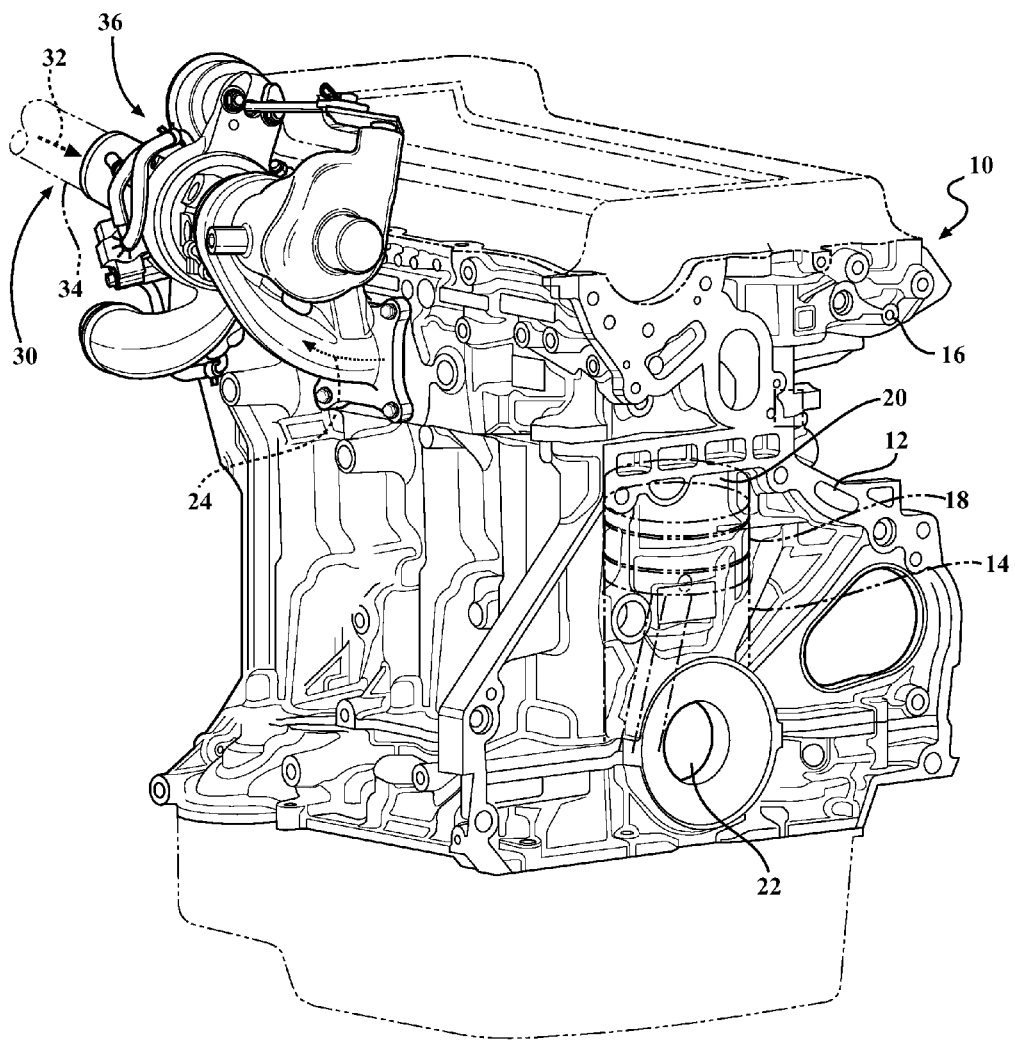
FIG. 1 is a perspective view of an engine with a turbocharger according to an embodiment of the disclosure.

Referring to the drawings wherein like reference numbers correspond to like or similar components throughout the several figures, FIG. 1 illustrates an internal combustion engine 10. The engine 10 also includes a cylinder block 12 with a plurality of cylinders 14 arranged therein. As shown in FIG. 1, the engine 10 may also include a cylinder head 16 that is mounted on the cylinder block 12. Each cylinder 14 includes a piston 18 configured to reciprocate therein.

Combustion chambers 20 are formed within the cylinders 14 between the bottom surface of the cylinder head 16 and the tops of the pistons 18. As known by those skilled in the art, each of the combustion chambers 20 receives fuel and air from the cylinder head 16 that form a fuel-air mixture for subsequent combustion inside the subject combustion chamber. The cylinder head 16 is also configured to exhaust post-combustion gases from the combustion chambers 20. The engine 10 also includes a crankshaft 22 configured to rotate within the cylinder block 12. The crankshaft 22 is rotated by the pistons 18 as a result of an appropriately proportioned fuel-air mixture being burned in the combustion chambers 20. After the air-fuel mixture is burned inside a specific combustion chamber 20, the reciprocating motion of a particular piston 18 serves to exhaust post-combustion gases 24 from the respective cylinder 14.

As shown in FIG. 1, the engine 10 additionally includes an induction system 30 configured to channel an airflow 32 from the ambient to the cylinders 14. The induction system 30 includes an intake air duct 34, a turbocharger 36 (also shown in FIGS. 2-3), and an intake manifold (not shown). Although not shown, the induction system 30 may additionally include an air filter upstream of the turbocharger 36 for removing foreign particles and other airborne debris from the airflow 32. The intake air duct 34 is configured to channel the airflow 32 from the ambient to the turbocharger 36, while the turbocharger is configured to pressurize the received airflow, and discharge the pressurized airflow to the intake manifold. The intake manifold in turn distributes the previously pressurized airflow 32 to the cylinders 14 for mixing with an appropriate amount of fuel and subsequent combustion of the resultant fuel-air mixture.

Figure 3:
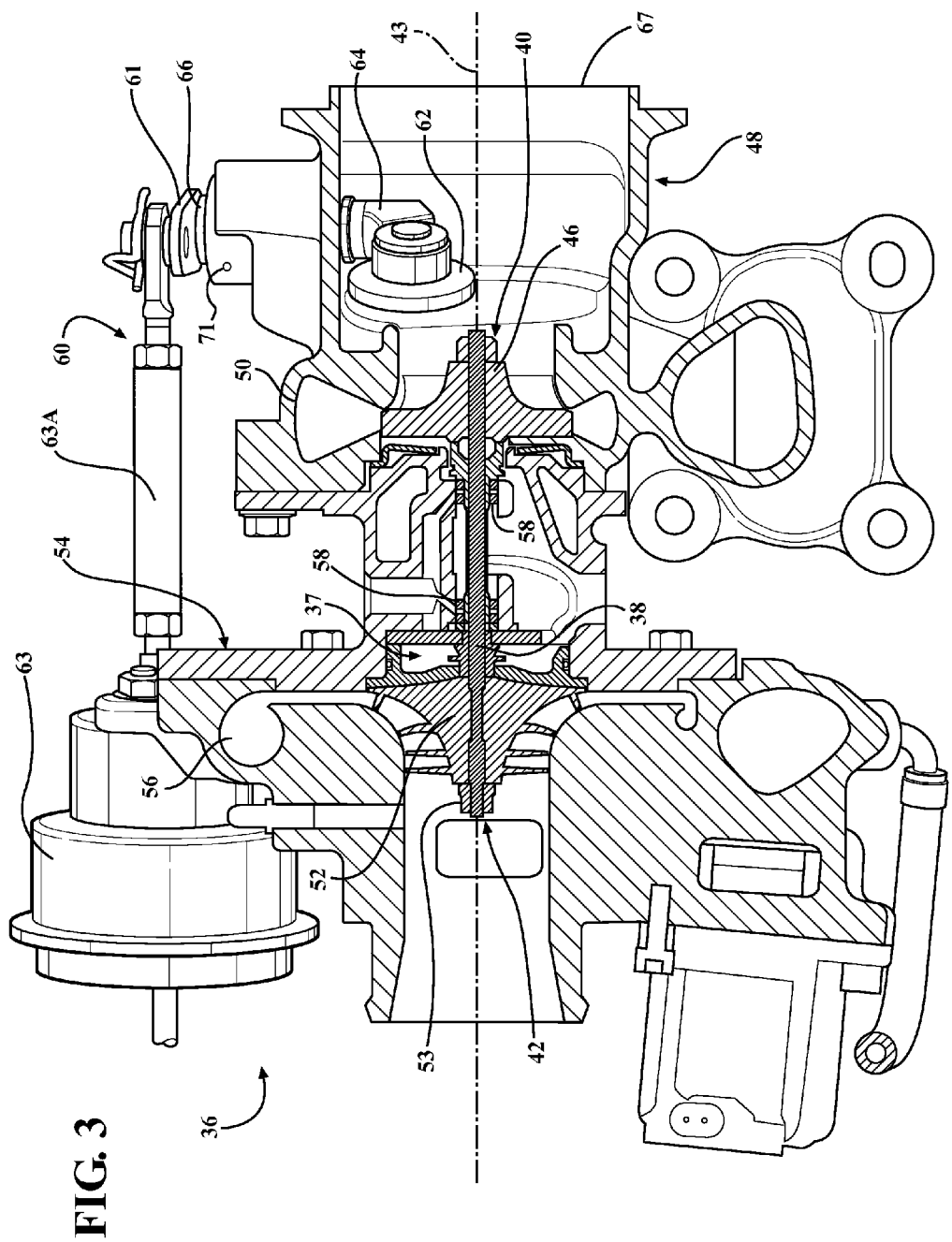
FIG. 3 is a schematic close-up partial cross-sectional view of the shaft and bushing subassembly shown in FIGS. 1 and 2.

As shown in FIG. 3, the turbocharger 36 includes a rotating assembly 37. The rotating assembly 37 includes a shaft 38 having a first end 40 and a second end 42. The rotating assembly 37 also includes a turbine wheel 46 mounted on the shaft 38 proximate to the first end 40 and configured to be rotated along with the shaft 38 about an axis 43 by post-combustion gases 24 emitted from the cylinders 14. The turbine wheel 46 is typically formed from a temperature and oxidation resistant material, such as a nickel-chromium-based "inconel" super-alloy to reliably withstand temperatures of the post-combustion gases 24, which in some engines may approach 2,000 degrees Fahrenheit. The turbine wheel 46 is disposed inside a turbine housing 48 that includes a turbine volute or scroll 50. The turbine scroll 50 receives the post-combustion exhaust gases 24 and directs the exhaust gases to the turbine wheel 46. The turbine scroll 50 is configured to achieve specific performance characteristics, such as efficiency and response, of the turbocharger 36.

As further shown in FIG. 3, the rotating assembly 37 also includes a compressor wheel 52 mounted on the shaft 38 between the first and second ends 40, 42. The compressor wheel 52 is retained on the shaft 38 via a specially configured fastener, such as a jam nut 53. As understood by those skilled in the art, a jam nut 53 is a type of fastener that includes pinched or unequal thread pitch internal threads to engage external threads of a mating component, for example the shaft 38. Such a thread configuration of the jam nut 53 serves to minimize the likelihood of the jam nut coming loose from the shaft 38 during operation of the turbocharger 36. Additionally, the direction of the thread on the jam nut 53 may be selected such that the jam nut will have a tendency to tighten rather than loosen as the shaft 38 is spun up by the post-combustion gases 24.

The compressor wheel 52 is configured to pressurize the airflow 32 being received from the ambient for eventual delivery to the cylinders 14. The compressor wheel 52 is disposed inside a compressor cover 54 that includes a compressor volute or scroll 56. The compressor scroll 56 receives the airflow 32 and directs the airflow to the compressor wheel 52. The compressor scroll 56 is configured to achieve specific performance characteristics, such as peak airflow and efficiency of the turbocharger 36. Accordingly, rotation is imparted to the shaft 38 by the post-combustion exhaust gases 24 energizing the turbine wheel 46, and is in turn communicated to the compressor wheel 52 owing to the compressor wheel being fixed on the shaft.

The rotating assembly 37 is supported for rotation about the axis 43 via journal bearings 58. During operation of the turbocharger 36, the rotating assembly 37 may frequently operate at speeds over 100,000 revolutions per minute (RPM) while generating boost pressure for the engine 10. As understood by those skilled in the art, the variable flow and force of the post-combustion exhaust gases 24 influences the amount of boost pressure that may be generated by the compressor wheel 52 throughout the operating range of the engine 10.

Figure 2:
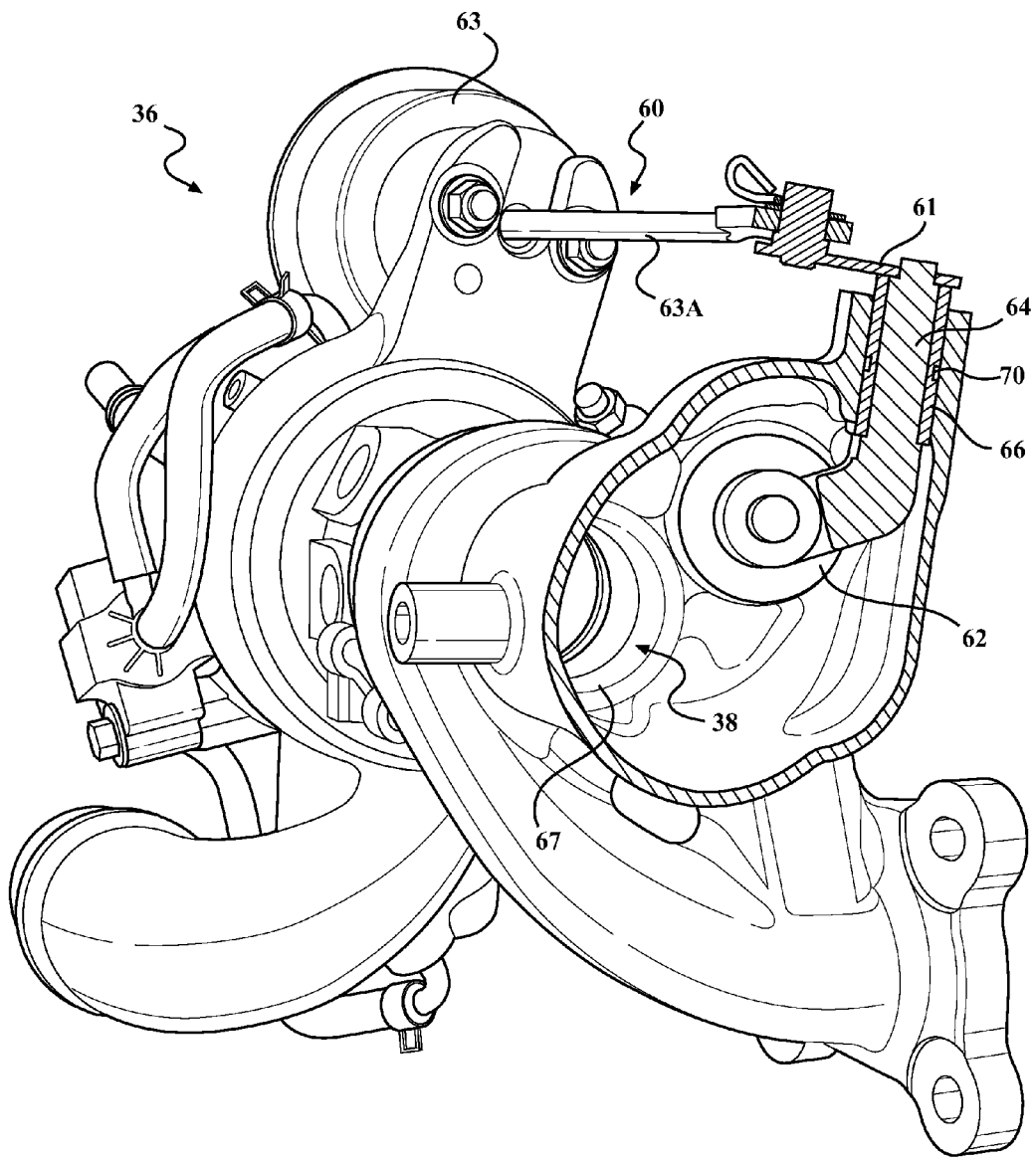
FIG. 2 is a perspective partial cross-sectional view of the turbocharger shown in FIG. 1, showing a waste-gate assembly that includes a valve, a shaft connected to the valve and configured to rotate within a bushing.

With resumed reference to both FIGS. 2 and 3, the turbocharger 36 includes a waste-gate assembly 60. The waste-gate assembly 60 is configured to selectively redirect at least a portion of the post-combustion exhaust gases 24 away from the turbine wheel 46 and thereby limit rotational speed of the rotating assembly 37 and pressure of the airflow 32 received from the ambient. The waste-gate assembly 60 includes a valve 62, a rotatable shaft 64 connected to the valve 62 and a bushing 66 fixed axially relative to the turbine housing 48. As shown in FIG. 4, the turbocharger 36 includes a locating feature configured to set the bushing relative to the turbine housing 48. As shown, the locating feature may be a specifically positioned circumferential groove 70 (FIGS. 2 and 4) that is engaged by a pin 71 (FIG. 3) that is itself pressed into a specifically formed hole in the turbine housing 48. As maybe seen from FIG. 3, the bushing 66 is disposed concentrically around the shaft 64 such that the shaft rotates inside the bushing to thereby selectively open and close the valve 62 for controlling a bypass (not shown) for post-combustion exhaust gases 24 between the scroll 50 and a turbine housing outlet 67. As shown in FIGS. 2-3, the waste-gate assembly 60 additionally includes an arm 61 fixed to the shaft 64. Furthermore, the turbocharger 36 includes an actuator 63 having a rod 63A that is operatively connected to the arm 61. The actuator 63 is configured to displace or rotate the arm 61 to thereby selectively open and close the valve 62.

As shown in FIGS. 4-5, the shaft 64 is defined by an outer surface 64-1. The bushing 66 is defined by a respective inner surface 66-1, outer surface 66-2, and length 66-3. The outer surface 64-1 of the shaft 64 is in contact with and rotates relative to the inner surface 66-1 of the bushing 66 when the waste-gate valve assembly 60 is operated. A predetermined design clearance 72 is established between the outer surface 64-1 and the inner surface 66-1 to thereby provide an effective bearing contact between the shaft 64 and the bushing 66. However, following repeated exposure to operating temperatures and contaminants, the turbine housing 48 frequently experiences corrosion, oxidation, and dimensional distortion, which tends to reduce the design clearance 72 between the shaft 64 and the bushing 66. Additionally, the remaining clearance 72 in such a "used" or heat-cycled turbine housing 48 may collect various particulates that tend to increase friction between the shaft 64 and the bushing 66 and may eventually lead to seizure between the subject components.

To counteract such friction between the bushing 66 and the shaft 64, and thereby avoid seizure of the shaft relative to the bushing, the inner surface 66-1 includes a plurality of longitudinal grooves 74. The longitudinal grooves 74 are configured to avoid seizure of the shaft 64 relative to the bushing 66. Each longitudinal groove 74 is defined by a respective, width 74-1, depth 74-2, and length 74-3. The longitudinal grooves 74 may be evenly spaced around the inner surface 66-1 and extend partially out toward the outer surface 66-2. The longitudinal grooves 74 are configured to collect particulates to thereby reduce the friction between the shaft 64 and the bushing 66. The number of individual longitudinal grooves 74 may be three, four (as shown in FIG. 5), or greater, depending generally on the size and packaging of the particular shaft 64 and bushing 66. Additionally, the length 74-3 of each respective longitudinal groove 74 may extend along at least 75% of the length 66-3 of the bushing 66.

As shown in FIG. 5, at least on the plurality of longitudinal grooves 74 may include a low-friction material 76. The inclusion of the low-friction material 76 in the longitudinal grooves 74 is beneficial for controlling friction between the shaft 64 and the bushing 66 in a heat-cycled turbocharger 36, and may be configured as a graphite insert. The low-friction material 76 may also be a ceramic-based material. The ceramic-based material is to be selected based on having a material hardness that exceeds that of typical hardened steels. Additionally, the ceramic-based material is to be selected for its resistance to abrasion at elevated temperatures that are likely to be encountered by the turbocharger 36 during operation. Furthermore, the ceramic-based low-friction material 76 may have a matrix composite structure purposefully incorporating both ceramic-ceramic or ceramic and non-ceramic materials. Such a matrix structure of the low-friction material 76 may, for example, be a silicon carbide, silicon nitride, chromium carbide, zirconia, carbon-carbon, or metal-ceramic composite.

The low-friction material 76 within the longitudinal grooves 74 is intended to be positioned in predetermined locations 78 of highest specific loading, i.e., pressure, between the shaft 64 and the bushing 66 during operation of the waste-gate assembly 60. The locations 78 of highest specific loading between the shaft 64 and the bushing 66 may be identified via analytical tools, such as Finite Element Analysis (FEA), and/or empirically during testing and development of the turbocharger 36. As shown in FIG. 6, the outer surface 64-1 of the shaft 64 may similarly include inserts from the low-friction material 76 to further reduce abrasion between the shaft 64 and the bushing 66. Accordingly, the low-friction material 76 inserts could be arranged in discrete locations as sections 80 on the shaft's outer surface 64-1.

The detailed description and the drawings or figures are supportive and descriptive of the disclosure, but the scope of the disclosure is defined solely by the claims. While some of the best modes and other embodiments for carrying out the claimed disclosure have been described in detail, various alternative designs and embodiments exist for practicing the disclosure defined in the appended claims. Furthermore, the embodiments shown in the drawings or the characteristics of various embodiments mentioned in the present description are not necessarily to be understood as embodiments independent of each other. Rather, it is possible that each of the characteristics described in one of the examples of an embodiment can be combined with one or a plurality of other desired characteristics from other embodiments, resulting in other embodiments not described in words or by reference to the drawings. Accordingly, such other embodiments fall within the framework of the scope of the appended claims.

The invention claimed is:

1. A turbocharger for pressurizing an airflow for delivery to an internal combustion engine that generates post-combustion gases, the turbocharger comprising:
   a turbine housing and a compressor cover;
   a rotating assembly having a turbine wheel disposed inside the turbine housing and a compressor wheel disposed inside the compressor cover, wherein the rotating assembly is rotated about an axis by the post-combustion gases; and
   a waste-gate assembly configured to selectively redirect at least a portion of the post-combustion gases away from the turbine wheel and thereby limit rotational speed of the rotating assembly and a pressure of the airflow received from the ambient, the waste-gate assembly having:
   a valve, a rotatable shaft connected to the valve, and a bushing fixed relative to the turbine housing and disposed concentrically around the shaft such that the shaft rotates inside the bushing to thereby selectively open and close the valve;
   wherein the bushing is defined by a length, an outer surface in contact with the turbine housing, and an inner surface in contact with the shaft, and wherein the inner surface includes a plurality of longitudinal grooves configured to counteract friction between the bushing and the shaft and avoid seizure of the shaft relative to the bushing.

2. The turbocharger of claim 1, wherein at least one of the longitudinal grooves includes a low-friction material.

3. The turbocharger of claim 2, wherein the low-friction material is graphite.

4. The turbocharger of claim 2, wherein the low-friction material is a ceramic-based material.

5. The turbocharger of claim 4, wherein the ceramic-based material is one of a silicon carbide, silicon nitride, chromium carbide, zirconia, carbon-carbon composite, and metal-ceramic composite.

6. The turbocharger of claim 1, wherein the longitudinal grooves are evenly spaced around the inner surface and extend out toward the outer surface.

7. The turbocharger of claim 6, wherein the plurality of longitudinal grooves includes four individual grooves.

8. The turbocharger of claim 1, wherein at least one of the plurality of longitudinal grooves extends along at least 75% of the length of the bushing.

9. The turbocharger of claim 1, wherein at least one of the plurality of longitudinal grooves is configured to collect particulates to thereby reduce the friction between the bushing and the shaft.

10. The turbocharger of claim 1, further comprising a locating feature configured to set the bushing relative to the turbine housing.

11. An internal combustion engine comprising:
    a cylinder configured to receive an air-fuel mixture for combustion therein;
    a reciprocating piston disposed inside the cylinder and configured to exhaust post-combustion gases therefrom; and
    a turbocharger in fluid communication with the piston and configured to pressurize an airflow being received from the ambient and deliver the pressurized airflow to the cylinder, the turbocharger including:
    a turbine housing and a compressor cover;
    a rotating assembly having a turbine wheel disposed inside the turbine housing and a compressor wheel disposed inside the compressor cover, wherein the rotating assembly is rotated about an axis by the post-combustion gases; and
    a waste-gate assembly configured to selectively redirect at least a portion of the post-combustion gases away from the turbine wheel and thereby limit rotational speed of the rotating assembly and a pressure of the airflow received from the ambient, the waste-gate assembly having:
    a valve, a rotatable shaft connected to the valve, and a bushing fixed relative to the turbine housing and disposed concentrically around the shaft such that the shaft rotates inside the bushing to thereby selectively open and close the valve;

wherein the bushing is defined by a length, an outer surface in contact with the turbine housing, and an inner surface in contact with the shaft, and wherein the inner surface includes a plurality of longitudinal grooves configured to counteract friction between the bushing and the shaft and avoid seizure of the shaft relative to the bushing.

12. The engine of claim 11, wherein at least one of the longitudinal grooves includes a low-friction material.

13. The engine of claim 12, wherein the low-friction material is graphite.

14. The engine of claim 12, wherein the low-friction material is a ceramic-based material.

15. The engine of claim 14, wherein the ceramic-based material is one of a silicon carbide, silicon nitride, chromium carbide, zirconia, carbon-carbon composite, and metal-ceramic composite.

16. The engine of claim 11, wherein the longitudinal grooves are evenly spaced around the inner surface and extend out toward the outer surface.

17. The engine of claim 16, wherein the plurality of longitudinal grooves includes four individual grooves.

18. The engine of claim 11, wherein at least one of the plurality of longitudinal grooves extends along at least 75% of the length of the bushing.

19. The engine of claim 11, wherein at least one of the plurality of longitudinal grooves is configured to collect particulates to thereby reduce the friction between the bushing and the shaft.

20. The engine of claim 11, wherein the turbocharger includes a locating feature configured to set the bushing relative to the turbine housing.

* * * * *